United States Patent
Xiao

(10) Patent No.: US 11,056,066 B2
(45) Date of Patent: Jul. 6, 2021

(54) WHITE BALANCE METHOD AND DEVICE FOR LCD PANEL

(71) Applicant: Shenzhen China Star Optoelectronics Technology Co., Ltd., Shenzhen (CN)

(72) Inventor: Guangxing Xiao, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 394 days.

(21) Appl. No.: 16/097,280

(22) PCT Filed: Sep. 14, 2018

(86) PCT No.: PCT/CN2018/105696
§ 371 (c)(1),
(2) Date: Oct. 29, 2018

(87) PCT Pub. No.: WO2019/227772
PCT Pub. Date: Dec. 5, 2019

(65) Prior Publication Data
US 2021/0082358 A1    Mar. 18, 2021

(30) Foreign Application Priority Data

May 29, 2018    (CN) .......................... 201810531939.9

(51) Int. Cl.
*G09G 3/36* (2006.01)
*G02F 1/1335* (2006.01)

(52) U.S. Cl.
CPC ..... *G09G 3/3607* (2013.01); *G02F 1/133514* (2013.01); *G09G 2320/0666* (2013.01)

(58) Field of Classification Search
CPC ........ G09G 3/34–3696; G09G 2300/00–0895; G09G 2310/00–0297
See application file for complete search history.

(56) References Cited

U.S. PATENT DOCUMENTS 9,472,144 B2    10/2016    McRae et al.
2009/0141221 A1*    6/2009    Taguchi ............ G02F 1/133514
349/109

(Continued)

FOREIGN PATENT DOCUMENTS

| CN | 103761947 A | 4/2014 |
|---|---|---|
| CN | 107358933 A | 11/2017 |
| CN | 107863080 A | 3/2018 |

*Primary Examiner* — Sanghyuk Park
(74) *Attorney, Agent, or Firm* — Leong C. Lei

(57) ABSTRACT

The present invention teaches a white balance method and device for a LCD panel. The method includes the following steps. Step S1 provides a LCD panel, including a mask-joint area and a non-mask-joint area outside the mask-joint area. The mask-joint area includes multiple first color resists arranged in an array, and the non-mask-joint area includes multiple second color resists arranged in an array. The first and second color resists are of different dimensions. Step S2 obtains a first white balance driving table for the mask-joint area and a second white balance driving table for the non-mask-joint area. Step S3 conducts white balance to the mask-joint area and non-mask-joint area using the first and second white balance driving tables, respectively. By applying different white balance driving tables to the mask-joint area and the non-mask-joint area, the white balance effect is improved, and the display quality of the LCD panel is enhanced.

4 Claims, 4 Drawing Sheets

(56) References Cited

U.S. PATENT DOCUMENTS

| | | | | |
|---|---|---|---|---|
| 2013/0050236 A1* | 2/2013 | Hsu | ..................... | G09G 5/02 |
| | | | | 345/589 |
| 2015/0084996 A1* | 3/2015 | Yamakawa | .............. | H04N 9/73 |
| | | | | 345/690 |
| 2015/0138488 A1* | 5/2015 | Shiomi | ................ | G09G 3/3666 |
| | | | | 349/69 |
| 2016/0284767 A1 | 9/2016 | Phan et al. | | |

\* cited by examiner

```
┌─────────────────────────────────────────────────────────────────────┐
│ Providing a LCD panel having a mask-joint area and a non-mask-joint area │
│ outside the mask-joint area, where the mask-joint area includes first color resists │─S1
│ arranged in an array, the non-mask-joint area includes second color resists │
│ arranged in an array, and the first and second color resists are of different │
│ dimensions;                                                          │
└─────────────────────────────────────────────────────────────────────┘
                                    │
                                    ▼
┌─────────────────────────────────────────────────────────────────────┐
│ Obtaining a first white balance driving table for the mask-joint area and a second │─S2
│ white balance driving table for the non-mask-joint area;            │
└─────────────────────────────────────────────────────────────────────┘
                                    │
                                    ▼
┌─────────────────────────────────────────────────────────────────────┐
│ Conducting white balance to the mask-joint area and non-mask-joint area using │─S3
│ the first and second white balance driving tables                    │
└─────────────────────────────────────────────────────────────────────┘
```

Fig. 1

WHITE BALANCE METHOD AND DEVICE FOR LCD PANEL

FIELD OF THE INVENTION

The present invention is generally related to the field of display technology, and more particularly to a method and a device for achieving white balance on a LCD panel.

BACKGROUND OF THE INVENTION

Liquid crystal display (LCD) is the mainstream display device and, due to its high quality, power efficiency, thin dimension, and high applicability, is widely applied to consumer appliances such as mobile phones, televisions, personal digital assistants, digital camera, notebook computers, desktop calculators, etc.

Existing LCD devices are usually back-lighted display devices, and include a LCD panel and a backlight module. The principle behind a LCD panel is to place liquid crystal molecules between two glass substrates, and to alter the alignment of the liquid crystal molecules by the electrical field formed between the substrates. As such, light from the backlight module is refracted to produce pictures.

Existing LCD panels, due to different driving mechanisms and properties, different degrees of discrepancy exist between their white color coordinates. Without conducting white balance to resolve this discrepancy, there will be noticeable color display differences between LCD panels. Therefore, white balance tracking and correction is often conducted during the manufacturing process of LCD panels so as to achieve consistent color display from different LCD panels.

Current white balance method for LCD panels involves establishing white balance data table for a LCD panel, and then conducting white balance to the LCD panel according to the white balance data table. However, as display technology is continuously advanced, the resolution of LCD panels is also continuously increasing. 8K ultra high definition LCD panel has a resolution 7680×4320, which is 16 times greater than ordinary 2K LCD panel's 1920×1080 resolution, and whose clarity is also 16 times to that of a Blue-ray DVD. Due to such a high resolution, the image is so vivid for every detail and a viewer would feel like he/she is personally on the scene. Even the viewer is very close to the panel, the viewer cannot perceive any pixel of the panel. Existing method for manufacturing 8K LCD panel requires tiled masks. Then the existing 8K LCD panel includes a mask-joint area and non-mask-joint areas to the sides of the mask-joint area. The color resists for the sub-pixels in the mask-joint area would be smaller than the color resists of the sub-pixels in the non-mask-joint area. Under a same gray level, the two color resists permit different amounts of light. Existing technique does not distinguish mask-joint area and non-mask-joint area when conducting white balance, resulting in less satisfactory white balance effect.

SUMMARY OF THE INVENTION

An objective of the present invention is to provide a white balance method for a LCD panel capable improving white balance effect and enhancing display quality of the LCD panel, especially an 8K LCD panel.

Another objective of the present invention is to provide a white balance device for a LCD panel capable improving white balance effect and enhancing display quality of the LCD panel, especially an 8K LCD panel.

To achieve the objectives, the present invention teaches a white balance method for a LCD panel, including the following steps.

Step S1 provides a LCD panel, including a mask-joint area and a non-mask-joint area outside the mask-joint area.

where the mask-joint area comprises a plurality of first color resists arranged in an array, the non-mask-joint area comprises multiple second color resists arranged in an array, and the first and second color resists are of different dimensions;

Step S2 obtains a first white balance driving table for the mask-joint area and a second white balance driving table for the non-mask-joint area.

Step S3 conducts white balance to the mask-joint area and non-mask-joint area using the first and second white balance driving tables, respectively.

Step S2 specifically includes the following steps.

Preparing in advance two white balance driving tables.

Obtaining a first white balance driving table for the mask-joint area and a second white balance driving table for the non-mask-joint area, based on a preset correspondence relationship.

Step S2 specifically includes the following steps.

Preparing a white balance base driving table, a first scale factor, and a second scale factor.

Scaling the white balance base driving table using the first and second scale factors, and obtaining a first white balance driving table for the mask-joint area and a second white balance driving table for the non-mask-joint area.

Step S3 specifically includes the following steps: partitioning the mask-joint area into multiple first sub-areas, assigning weights respectively to the first sub-areas, and conducting white balance respectively to the first sub-areas based on the corresponding weights and the first white balance driving table.

Partitioning the non-mask-joint area into multiple second sub-areas, assigning weights respectively to the second sub-areas, and conducting white balance respectively to the second sub-areas based on the corresponding weights and the second white balance driving table.

The LCD panel is an 8K LCD panel.

The present invention also teaches a white balance device for conducting white balance to a LCD panel, including an acquisition unit and a processing unit connected to the acquisition unit.

The mask-joint area includes multiple first color resists arranged in an array, and the non-mask-joint area includes multiple second color resists arranged in an array. The first and second color resists are of different dimensions.

The acquisition unit obtains a first white balance driving table for the mask-joint area and a second white balance driving table for the non-mask-joint area.

The processing unit conducts white balance to the mask-joint area and non-mask-joint area using the first and second white balance driving tables, respectively.

The white balance device further includes a storage unit storing a first white balance driving table and a second white balance driving table prepared in advance.

The processing unit, based on a preset correspondence relationship, obtains a first white balance driving table for the mask-joint area and a second white balance driving table for the non-mask-joint area from the storage unit.

The white balance device further includes a storage unit storing a white balance base driving table, a first scale factor, and a second scale factor.

The acquisition unit scales the white balance base driving table using the first and second scale factors, and obtains a first white balance driving table for the mask-joint area and a second white balance driving table for the non-mask-joint area.

The processing unit further conducts white balance by partitioning the mask-joint area into multiple first sub-areas, assigning weights respectively to the first sub-areas, and conducting white balance respectively to the first sub-areas based on the corresponding weights and the first white balance driving table, partitioning the non-mask-joint area into multiple second sub-areas, assigning weights respectively to the second sub-areas, and conducting white balance respectively to the second sub-areas based on the corresponding weights and the second white balance driving table.

The LCD panel is an 8K LCD panel.

The advantages of the present invention are as follows. The present invention teaches a white balance method for a LCD panel includes the following steps. Step S1 provides a LCD panel, including a mask-joint area and a non-mask-joint area outside the mask-joint area. The mask-joint area includes multiple first color resists arranged in an array, and the non-mask-joint area includes multiple second color resists arranged in an array. The first and second color resists are of different dimensions. Step S2 obtains a first white balance driving table for the mask-joint area and a second white balance driving table for the non-mask-joint area. Step S3 conducts white balance to the mask-joint area and non-mask-joint area using the first and second white balance driving tables, respectively. By applying different white balance driving tables to the mask-joint area and the non-mask-joint area, the white balance effect is improved, and the display quality of the LCD panel is enhanced. The present invention also teaches a white balance device for a LCD panel capable of improving white balance effect and enhancing display quality of the LCD panel.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

FIG. 1 is a flow diagram showing a white balance method for a LCD panel according to an embodiment of the present invention.

DETAILED DESCRIPTION OF PREFERRED EMBODIMENTS

The following descriptions for the respective embodiments are specific embodiments capable of being implemented for illustrations of the present invention with referring to appended figures.

As shown in FIG. 1, a white balance method for a liquid crystal display (LCD) panel includes the following steps.

Figure 2:
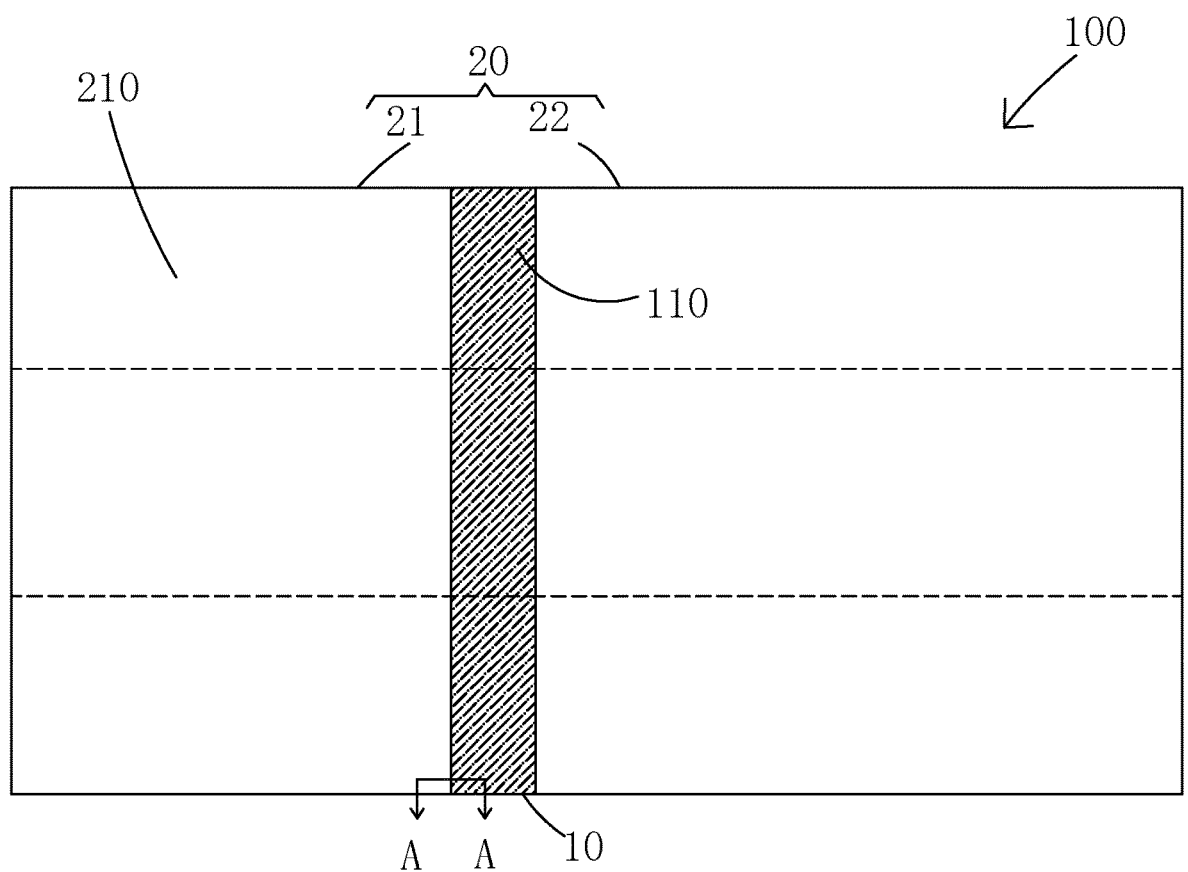
FIG. 2 is a top-view diagram showing a LCD panel to be processed by the white balance method of FIG. 1.

Step S1, as shown in FIG. 2, provides a LCD panel 100, including a mask-joint area 10 and a non-mask-joint area 20 outside the mask-joint area 10.

Specifically, in some embodiments, the non-mask-joint area 20 may include a first non-mask-joint area 21 and a second non-mask-joint area 22 to the lateral sides of the mask-joint area 10, as shown in FIG. 2.

Figure 3:
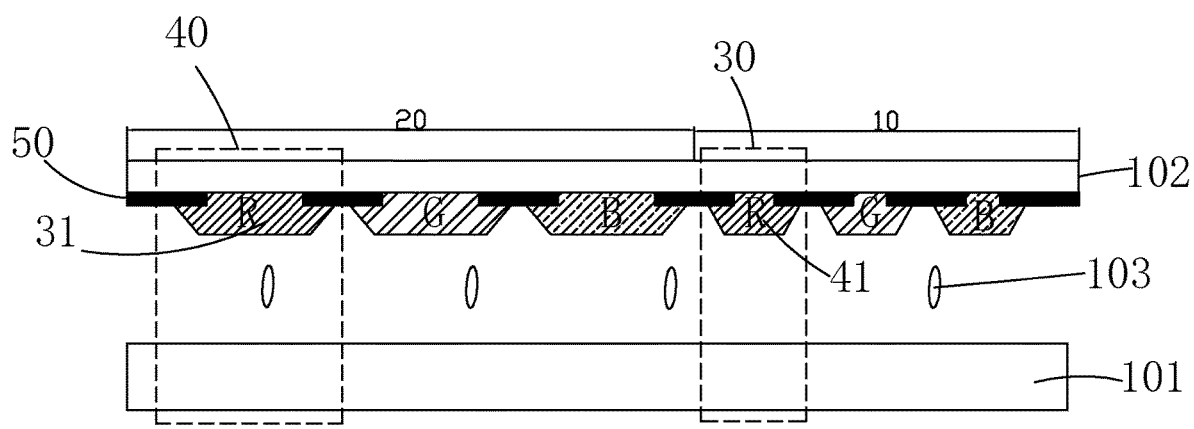
FIG. 3 is a sectional diagram showing sub-pixels of the LCD panel of FIG. 2.

Specifically, the mask-joint area 10 includes multiple first sub-pixels 30 arranged in an array, and the non-mask-joint area 20 includes multiple second sub-pixels 40 arranged in an array, as shown in FIG. 3. Each first sub-pixel 30 includes a first color resist 31 and each second sub-pixel 40 includes a second color resist 41. The first and second color resists 31 and 41 are of different dimensions.

Furthermore, in some embodiments, the LCD panel 100 specifically includes an array substrate 101, a color filter (CF) substrate 102 opposite to the array substrate 101, and a liquid crystal layer 103 disposed between the array substrate 101 and the CF substrate 102, as shown in FIG. 3. The first and second color resists 31 and 41 are disposed on the CF substrate 102. A black matrix 50 is configured between neighboring first color resists 31, between neighboring second color resists 41, and between neighboring first and second color resists 31 and 41.

Some components of the LCD panel are not shown such as common electrode and alignment film on the CF substrate 102, and thin film transistor (TFT) array, pixel electrode, and alignment film on the array substrate 101, etc.

In addition, in some embodiments, the first and second color resists 31 and 41 may be formed on the array substrate 101 using the so-called color filter on array (COA) technique. This arrangement does not affect the embodiment of the present invention.

Preferably, both the first and second color resists 31 and 41 may include red (R) color resists, green (G) color resists, and blue (B) color resists. Color display is jointly achieved through the R, G, and B color resists. However, the present invention is not limited as such. Alternative embodiments may include yellow and white color resists, or color resists of other colors.

Specifically, the different dimensions of the first and second color resists 31 and 41 are mainly embodied in the different widths of the first and second color resists 31 and 41 along the lateral direction.

Specifically, the LCD panel 100 is an 8K LCD panel having 7680×4320 resolution. By applying different white balance driving tables to the mask-joint area and the non-mask-joint area of the 8K LCD panel, the white balance effect is improved, the color shift in the mask-joint area is reduced, and the display quality is enhanced.

Step S2 obtains a first white balance driving table for the mask-joint area 10 and a second white balance driving table for the non-mask-joint area.

The first and second white balance driving tables contains different white balance driving values. When the first color resists 31 are wider than the second color resists 41, the first white balance driving table has smaller driving values than those of the second white balance driving table. When the first color resists 31 are narrower than the second color resists 41, the first white balance driving table has greater driving values than those of the second white balance driving table. That is, the color resists have greater widths, the corresponding driving values in the white balance driving table are lower.

Specifically, in some embodiments, step S2 includes the following steps.

Preparing in advance two white balance driving tables.

Obtaining a first white balance driving table for the mask-joint area 10 and a second white balance driving table for the non-mask-joint area 20, based on a preset correspondence relationship.

Specifically, in some other embodiments, step S2 includes the following steps.

Preparing a white balance base driving table, a first scale factor, and a second scale factor.

Scaling the white balance base driving table using the first and second scale factors, and obtaining a first white balance driving table for the mask-joint area 10 and a second white balance driving table for the non-mask-joint area 20.

When the first color resists 31 are wider than the second color resists 41, the first scale factor is smaller than the second scale factor. When the first color resists 31 are narrower than the second color resists 41, the first scale factor is greater than the second scale factor.

It should be noted that, by using a white balance base driving table and scale factors to replace the preparation of the first and second white balance driving tables in advance, the amount of data is lowered, thereby reducing the storage space and storage cost required for the data.

Step S3 conducts white balance to the mask-joint area 10 and non-mask-joint area 20 using the first and second white balance driving tables, respectively.

Specifically, in some embodiments, step S3 includes the following steps: partitioning the mask-joint area 10 into multiple first sub-areas 110, assigning weights respectively to the first sub-areas 110, and conducting white balance respectively to the first sub-areas 110 based on the corresponding weights and the first white balance driving table.

Furthermore, each first sub-pixel 30 in the mask-joint area 10 is connected through a data line to the source IC providing data signals to the LCD panel. The data lines between the source IC and the first sub-pixels 30 located in different first sub-areas 110 have different lengths.

A first sub-area 110 is assigned a smaller weight than another first sub-area 110 if the former's first sub-pixels 30 have shorter data lines to the source IC than the latter's first sub-pixels 30 have.

Partitioning the non-mask-joint area 20 into multiple second sub-areas 210, assigning weights respectively to the second sub-areas 210, and conducting white balance respectively to the second sub-areas 210 based on the corresponding weights and the second white balance driving table.

Furthermore, each second sub-pixel 40 in the non-display area 20 is connected through a data line to the source IC providing data signals to the LCD panel. The data lines between the source IC and the second sub-pixels 40 located in different second sub-areas 210 have different lengths.

A second sub-area 210 is assigned a smaller weight than another second sub-area 210 if the former's second sub-pixels 40 have shorter data lines to the source IC than the latter's second sub-pixels 40 have.

The white balance effect to the LCD panel is further enhanced by the partitioning of the first and second sub-areas 110 and 210, and by assigning corresponding weights to first and second sub-areas 110 and 210.

Figure 4:
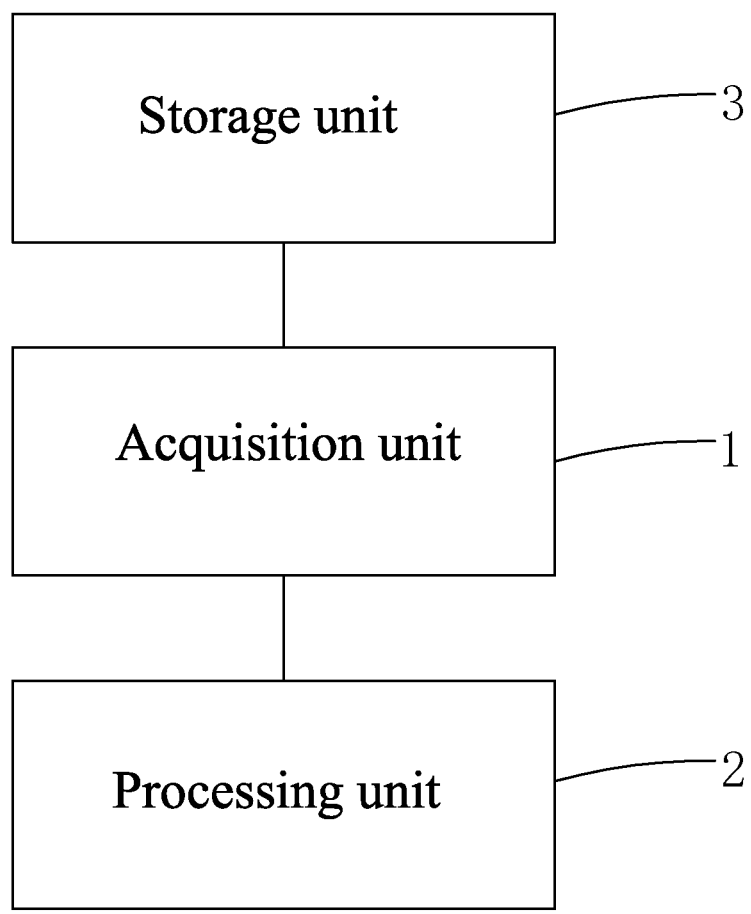
FIG. 4 is a schematic diagram showing a white balance device for a LCD panel according to an embodiment of the present invention.

As shown in FIG. 4, a white balance device for conducting white balance to a LCD panel 100 according to an embodiment of the present invention includes an acquisition unit 1 and a processing unit 2 connected to the acquisition unit 1.

The LCD panel 100 includes a mask-joint area 10 and a non-mask-joint area 20 outside the mask-joint area 10. The mask-joint area 10 includes multiple first sub-pixels 30 arranged in an array, and the non-mask-joint area 20 includes multiple second sub-pixels 40 arranged in an array. Each first sub-pixel 30 includes a first color resist 31 and each second sub-pixel 40 includes a second color resist 41. The first and second color resists 31 and 41 are of different dimensions.

The acquisition unit 1 obtains a first white balance driving table for the mask-joint area 10 and a second white balance driving table for the non-mask-joint area 20.

The processing unit 2 conducts white balance to the mask-joint area 10 and non-mask-joint area 20 using the first and second white balance driving tables, respectively.

Furthermore, in some embodiments, the LCD panel 100 specifically includes an array substrate 101, a color filter (CF) substrate 102 opposite to the array substrate 101, and a liquid crystal layer 103 disposed between the array substrate 101 and the CF substrate 102, as shown in FIG. 3. The first and second color resists 31 and 41 are disposed on the CF substrate 102. A black matrix 50 is configured between neighboring first color resists 31, between neighboring second color resists 41, and between neighboring first and second color resists 31 and 41.

Some components of the LCD panel are not shown such as common electrode and alignment film on the CF substrate 102, and thin film transistor (TFT) array, pixel electrode, and alignment film on the array substrate 101, etc.

In addition, in some embodiments, the first and second color resists 31 and 41 may be formed on the array substrate 101 using the so-called color filter on array (COA) technique. This arrangement does not affect the embodiment of the present invention.

Preferably, both the first and second color resists 31 and 41 may include red (R) color resists, green (G) color resists, and blue (B) color resists. Color display is jointly achieved through the R, G, and B color resists. However, the present invention is not limited as such. Alternative embodiments may include yellow and white color resists, or color resists of other colors.

Specifically, the different dimensions of the first and second color resists 31 and 41 are mainly embodied in the different widths of the first and second color resists 31 and 41 along the lateral direction.

Specifically, the LCD panel 100 is an 8K LCD panel having 7680×4320 resolution. By applying different white balance driving tables to the mask-joint area and the non-mask-joint area of the 8K LCD panel, the white balance effect is improved, the color shift in the mask-joint area is reduced, and the display quality is enhanced.

Specifically, the first and second white balance driving tables contains different white balance driving values. When the first color resists 31 are wider than the second color resists 41, the first white balance driving table has smaller driving values than those of the second white balance driving table. When the first color resists 31 are narrower than the second color resists 41, the first white balance driving table has greater driving values than those of the second white balance driving table. That is, the color resists have greater widths, the corresponding driving values in the white balance driving table are lower.

Specifically, in some embodiments, the white balance device further includes a storage unit 3 storing a first white balance driving table and a second white balance driving table prepared in advance.

The acquisition unit 1, based on a preset correspondence relationship, obtains a first white balance driving table for the mask-joint area 10 and a second white balance driving table for the non-mask-joint area 20 from the storage unit 3.

Specifically, in some other embodiments, the white balance device further includes a storage unit 3 storing a white balance base driving table, a first scale factor, and a second scale factor.

The acquisition unit 1 scales the white balance base driving table using the first and second scale factors, and obtains a first white balance driving table for the mask-joint area 10 and a second white balance driving table for the non-mask-joint area 20.

When the first color resists 31 are wider than the second color resists 41, the first scale factor is smaller than the second scale factor. When the first color resists 31 are narrower than the second color resists 41, the first scale factor is greater than the second scale factor.

It should be noted that, by using a white balance base driving table and scale factors to replace the preparation of the first and second white balance driving tables in advance, the amount of data is lowered, thereby reducing the storage space and storage cost required for the data.

Specifically, in some embodiments, the processing unit 2 conducts white balance by partitioning the mask-joint area 10 into multiple first sub-areas 110, assigning weights respectively to the first sub-areas 110, and conducting white balance respectively to the first sub-areas 110 based on the corresponding weights and the first white balance driving table.

Furthermore, each first sub-pixel 30 in the mask-joint area 10 is connected through a data line to the source IC providing data signals to the LCD panel. The data lines between the source IC and the first sub-pixels 30 located in different first sub-areas 110 have different lengths.

A first sub-area 110 is assigned a smaller weight than another first sub-area 110 if the former's first sub-pixels 30 have shorter data lines to the source IC than the latter's first sub-pixels 30 have.

The processing unit 2 further conducts white balance by partitioning the non-mask-joint area 20 into multiple second sub-areas 210, assigning weights respectively to the second sub-areas 210, and conducting white balance respectively to the second sub-areas 210 based on the corresponding weights and the second white balance driving table. Furthermore, the second sub-areas 210 are partitioned in accordance with their distance to the source IC of the LCD panel.

Furthermore, each second sub-pixel 40 in the non-display area 20 is connected through a data line to the source IC providing data signals to the LCD panel. The data lines between the source IC and the second sub-pixels 40 located in different second sub-areas 210 have different lengths.

A second sub-area 210 is assigned a smaller weight than another second sub-area 210 if the former's second sub-pixels 40 have shorter data lines to the source IC than the latter's second sub-pixels 40 have.

The white balance effect to the LCD panel is further enhanced by the partitioning of the first and second sub-areas 110 and 210, and by assigning corresponding weights to first and second sub-areas 110 and 210.

As described above, the present invention teaches a white balance method for a LCD panel includes the following steps. Step S1 provides a LCD panel 100, including a mask-joint area and a non-mask-joint area outside the mask-joint area. The mask-joint area includes multiple first color resists arranged in an array, and the non-mask-joint area includes multiple second color resists arranged in an array. The first and second color resists are of different dimensions. Step S2 obtains a first white balance driving table for the mask-joint area and a second white balance driving table for the non-mask-joint area. Step S3 conducts white balance to the mask-joint area and non-mask-joint area using the first and second white balance driving tables, respectively. By applying different white balance driving tables to the mask-joint area and the non-mask-joint area, the white balance effect is improved, and the display quality of the LCD panel is enhanced. The present invention also teaches a white balance device for a LCD panel capable of improving white balance effect and enhancing display quality of the LCD panel.

Above are embodiments of the present invention, which does not limit the scope of the present invention. Any equivalent amendments within the spirit and principles of the embodiment described above should be covered by the protected scope of the invention.

What is claimed is:

1. A white balance method for a liquid crystal display (LCD) panel, comprising:
    providing a LCD panel, comprising a mask-joint area and a non-mask-joint area outside the mask-joint area, where the mask-joint area comprises a plurality of first color resists arranged in an array, the non-mask-joint area comprises multiple second color resists arranged in an array, and the first and second color resists are of different dimensions;
    preparing a white balance base driving table, a first scale factor, and a second scale factor;
    scaling the white balance base driving table using the first and second scale factors, and obtaining a first white balance driving table for the mask-joint area and a second white balance driving table for the non-mask-joint area, where the first scale factor is smaller than the second scale factor if the first color resists are wider along lateral direction than the second color resists, and the first scale factor is greater than the second scale factor if the first color resists are narrower along lateral direction than the second color resists;
    partitioning the mask joint area into a plurality of first sub-areas, assigning weights respectively to the first sub-areas, and conducting white balance respectively to the first sub-areas based on corresponding weights and the first white balance driving table, where each first sub-pixel in the mask-joint area is connected through a data line to a source IC, and a first sub-area is assigned a smaller weight than another first sub-area if the first sub-pixels have shorter data lines to the source IC than another first sub-pixels have; and
    partitioning the non-mask-joint area into a plurality of second sub-areas, assigning weights respectively to the second sub-areas, and conducting white balance respectively to the second sub-areas based on corresponding weights and the second white balance driving table, where each second sub-pixel in the non-mask-joint area is connected through a data line to the source IC, and a second sub-area is assigned a smaller weight than another second sub-area if the second sub-pixels have shorter data lines to the source IC than another second sub-pixels have.

2. The white balance method according to claim 1, wherein the LCD panel is an 8K LCD panel.

3. A white balance device for conducting white balance to a LCD panel, comprising a storage unit, an acquisition unit and a processing unit connected to the acquisition unit, wherein
    the LCD panel comprises a mask-joint area and a non-mask-joint area outside the mask-joint area; the mask-joint area comprises a plurality of first sub-pixels arranged in an array, and the non-mask-joint area comprises a plurality of second sub-pixels arranged in an array; each first sub-pixel comprises a first color resist and each second sub-pixel comprises a second color resist; the first and second color resists are of different dimensions;

the storage unit stores a white balance base driving table, a first scale factor, and a second scale factor;

the acquisition unit scales the white balance base driving table using the first and second scale factors, and obtains a first white balance driving table for the mask-joint area and a second white balance driving table for the non-mask-joint area, where the first scale factor is smaller than the second scale factor if the first color resists are wider along lateral direction than the second color resists, and the first scale factor is greater than the second scale factor if the first color resists are narrower along lateral direction than the second color resists; and the processing unit partitions the mask-joint area into a plurality of first sub-areas, assigns weights respectively to the first sub-areas, and conducts white balance respectively to the first sub-areas based on corresponding weights and the first white balance driving table, partitions the non-mask-joint area into a plurality of second sub-areas, assigns weights respectively to the second sub-areas, and conducts white balance respectively to the second sub-areas based on corresponding weights and the second white balance driving table, where each first sub-pixel in the mask-joint area is connected through a data line to a source IC, a first sub-area is assigned a smaller weight than another first sub-area if the first sub-pixels have shorter data lines to the source IC than another first sub-pixels have, each second sub-pixel in the non-mask-joint area is connected through a data line to the source IC, and a second sub-area is assigned a smaller weight than another second sub-area if the second sub-pixels have shorter data lines to the source IC than another second sub-pixels have.

4. The white balance device according to claim 3, wherein the LCD panel is an 8K LCD panel.

\* \* \* \* \*